United States Patent [19]

Watanabe

[11] Patent Number: 4,934,259
[45] Date of Patent: Jun. 19, 1990

[54] AUTOMATIC AND CONTINUOUS RICE COOKING SYSTEM

[76] Inventor: Kenji Watanabe, 4-14-4, Murasakibaru, Kagoshima-shi, Kagoshima, Japan

[21] Appl. No.: 391,180

[22] Filed: Aug. 8, 1989

[30] Foreign Application Priority Data

Nov. 30, 1988 [JP] Japan .............................. 63-300470

[51] Int. Cl.$^5$ .......................... A23L 1/00; A23L 3/00; A47J 27/04
[52] U.S. Cl. ........................................ 99/339; 99/348; 99/355; 99/443 C; 99/477; 99/483; 99/516
[58] Field of Search ................. 99/352, 339, 353, 355, 99/348, 403, 404, 405, 406, 443 C, 443 R, 467, 477, 483, 516, 534, 536; 426/510, 511, 508, 461; 366/149

[56] References Cited

U.S. PATENT DOCUMENTS

| | | | |
|---|---|---|---|
| 959,448 | 5/1910 | Baxter | 99/443 C |
| 2,571,555 | 10/1951 | Fernandes | 99/443 C |
| 2,638,838 | 5/1953 | Talmey et al. | 99/443 C |
| 3,194,664 | 7/1965 | Eytinge | 99/534 |
| 3,778,521 | 12/1973 | Fisher et al. | 99/516 |
| 4,055,673 | 10/1977 | Mueller et al. | 99/519 |
| 4,181,072 | 1/1980 | Hirahara | 99/353 |
| 4,338,344 | 7/1982 | Brooks et al. | 99/404 |
| 4,561,347 | 12/1985 | Zaitu | 426/511 |
| 4,571,341 | 2/1986 | Sugimura | 426/510 |
| 4,677,907 | 7/1987 | Weibye | 99/483 |

FOREIGN PATENT DOCUMENTS 3307117 9/1984 Fed. Rep. of Germany ........ 99/516
50-19970 3/1975 Japan .

*Primary Examiner*—Timothy F. Simone
*Attorney, Agent, or Firm*—Frishauf, Holtz, Goodman & Woodward

[57] ABSTRACT

An automatic and continuous rice cooking system comprises a spiral rotary steam vessel with an elongated steam jacket having a semi-circular bottom and housing a screw conveyer, and a steam tunnel passage provided with a mesh conveyer connected to the outlet port of the vessel at its terminal end via a duct. As raw rice is charged inside the steam vessel from one end of the steam vessel, the rice is gradually steamed as it is conveyed by the screw conveyer toward the other end, during which time the rice is subjected to a steaming process in which starch is released from the rice, a gelatinization process in which the starch is gelatinized, and an adsorption process in which the gelatinized starch is adsorbed by the rice grains. The steamed rice is discharged from the steam vessel from one end thereof and is then gradually conveyed by a mesh conveyer inside the steam tunnel passage under high temperature and high humidity maintained by the supply of hot steam, and the rice is subjected to an additional adsorption process with the gelatinized starch supplied at the starting end of the conveyer, and a fixing process in which the rice grain surface is coated with the gelatinized starch. A sump for receiving the cooking juice discharged from the vessel together with the steamed rice is provided beneath the outlet port of the steam vessel. The sump includes a pipe for spraying and supplementing a portion of the cooking juice onto the surface of the rice grains that have been transferred from the steam vessel to the mesh conveyer, and a pipe for returning and supplementing a portion of the cooking juice back to the steam vessel at its mid portion.

21 Claims, 2 Drawing Sheets

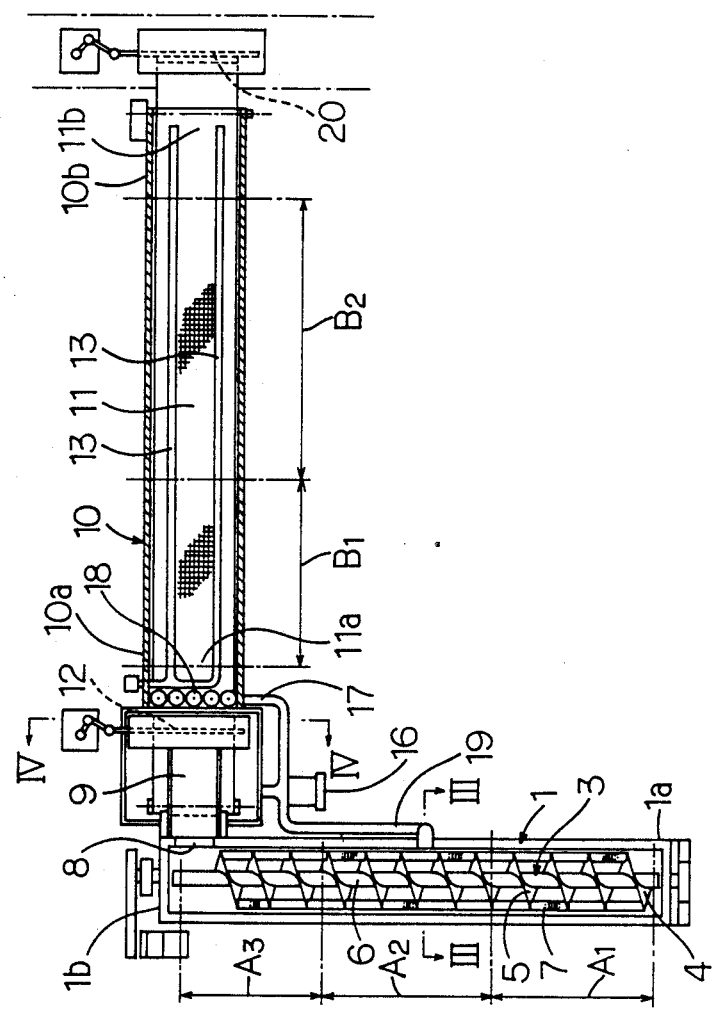

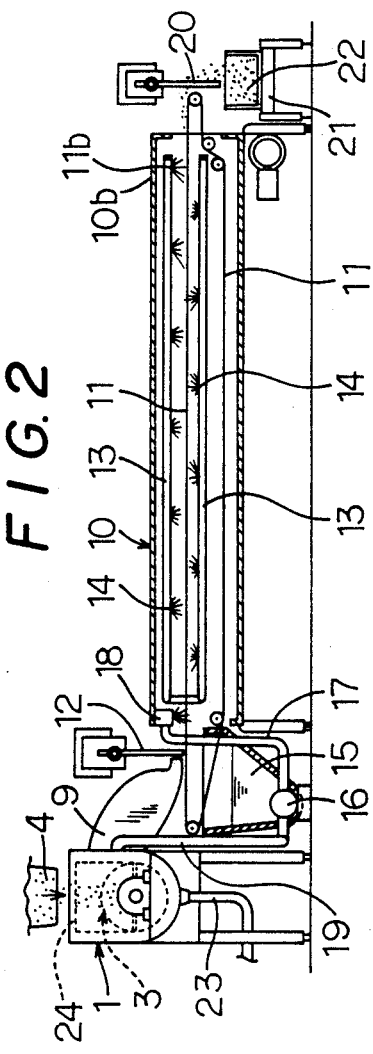
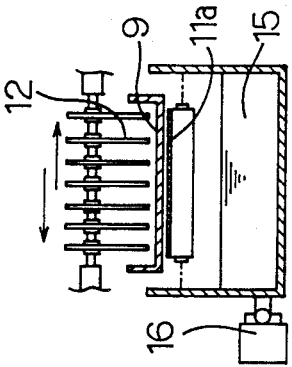
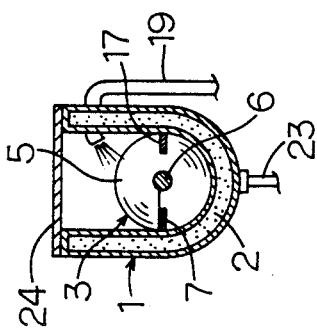

AUTOMATIC AND CONTINUOUS RICE COOKING SYSTEM

BACKGROUND OF THE INVENTION AND RELATED ART STATEMENT

The present invention relates to an automatic and continuous rice cooking system, and more particularly to a rice cooking system which comprises an elongated steam vessel provided with a screw conveyer therein and a passage to which steam is supplied, and in which is characterized in uncooked rice charged continuously at the inlet of the cooker is cooked and discharged out of the outlet of the system.

At caterers, hotels, and restaurants providing a large quantity of cooked rice at a time, or in businesses preparing secondary preservable products from cooked rice, a need for a system for cooking the rice continuously but without damaging the taste and the flavor is keenly felt.

A prior art system for continuously cooking the rice is disclosed, for example, in JPA Lay Open No. 19970/75. The system is structured to have a vertically inclined and elongated vessel in which a screw conveyer is provided. Water is retained at the bottom of said vessel, and by externally heating the water and by charging rinsed rice continuously inside the vessel at the bottom, the rice is cooked in the vessel at its bottom and then conveyed upward by means of the screw conveyer to be discharged from the vessel at the outlet provided at the upper end thereof.

Such elongated vessel with a screw conveyer is advantageous in that the rice is steamed and cooked in a continuous process when it is conveyed from one end to the other end of the vessel. However, because of the vessel being in an inclined arrangement, it is defective in that during the so-called steaming process when the rice cooked at the bottom of the vessel is conveyed upward by means of the screw conveyer to the upper portion of the vessel where there is no cooking juice, the cooked rice is inevitably subjected to kneading by the screw conveyer and collects into a doughy lump like a rice cake. This makes it impossible to obtain cooked rice retaining discrete grain forms when discharged from the outlet at the upper end of the vessel.

SUMMARY OF THE INVENTION

The present invention was contrived to obviate such defects of the prior art system. The cooking vessel provided with a screw conveyer according to the present invention is arranged in a horizontal position, and the "steaming process" in which the starch is released from each grain by steaming the rice, the "gelatinization process" in which the released starch is gelatinized, and a portion of the "adsorption process" in which gelatinized starch is once again adsorbed into the grains are all carried out in the vessel. The remaining portion of said "adsorption" process and the "fixing process" in which the gelatinized starch adsorbed in the grains is fixed to coat the surface of each grain are conducted after the rice is discharged from the vessel and transported into a net conveyer where hot water vapor is sprayed on the rice grains.

As a concrete means to carry out each of said processes, the present invention includes a spiral rotary steam vessel comprising an elongated steam jacket with a semi-circular bottom which houses a screw conveyer with stirring vanes arranged in the axial direction and mounted on the shaft of the vessel, a passage forming a steam tunnel which is connected to the outlet of the vessel at its terminal end via a duct and which houses a net or mesh conveyer provided with plural nozzles for spraying water vapor both on the top and the bottom of the conveyer surfaces, a sump for cooking juice which is provided below said duct, and supply paths for supplying a portion of the cooking juice into the steam vessel at its mid portion and into the starting end of the conveyer in the steam tunnel.

In the system of the present invention having the above construction, a predetermined amount of rice is sequentially charged into the steam vessel wherein a predetermined amount of water is pooled. While the charged rice is gradually boiled and conveyed toward the terminal end of the vessel by the screw conveyer, a process in which the starch is released from the rice and the gelatination process in which the released starch is gelatinized are conducted. The adsorption process in which the gelatinized starch is adsorbed in the rice once again is conducted in the vessel near the outlet.

The rice thus cooked is discharged onto the duct from the steam vessel outlet together with the cooking juice, dropped onto the starting end of the net or mesh conveyer housed in the conveyer passage in the form of a tunnel, and gradually conveyed toward the terminal end while being sprayed with hot water vapor both from the top and the bottom, during which time the remaining portion of said adsorption process and the fixing process in which the surface of the cooked rice grains is coated with the gelatinized starch are conducted.

The cooking juice discharged from the vessel outlet together with the cooked rice is retained in the sump provided below the duct. A portion of the cooking juice in the sump is sprayed onto the rice being conveyed from the end of the conveyer inside the tunnel passage, supplying gelatinized starch contained in the cooking juice onto the grain surface. The remaining portion of the cooking juice in the sump is returned to the vessel at its mid portion where the gelatination process shifts into the adsorption process, supplementing the cooking juice containing the gelatinized starch to ensure a sufficient supply of gelatinized starch during the adsorption process.

BRIEF DESCRIPTION OF THE DRAWINGS

Other objects and advantages of this invention will become apparent when taken in conjunction with description herein below of an embodiment shown in the accompanying drawings.

FIG. 1 is a plan view to show the construction of an automatic and continuous rice cooking system according to the present invention;

FIG. 2 is a side view of the system shown in FIG. 1;

FIG. 3 is a sectional view of the vessel shown in FIG. 1 along the line III—III; and, FIG. 4 is a sectional view of the tunnel passage shown in FIG. 1 along the line IV—IV to show the structure at its starting end.

DETAILED DESCRIPTION OF THE PREFERRED EMBODIMENT

An embodiment of the present invention system will now be explained referring to the accompanying drawings. FIG. 1 is a plan view and FIG. 2 is a side view. The system as a whole includes an elongated steam vessel 1 which is a horizontally positioned steam jacket and houses a screw conveyer 3, a steam tunnel passage 10 which is connected to the steam vessel at its one end at a right angle, and houses a horizontally positioned or mesh conveyer 11.

The steam vessel 1 comprises an elongated steam jacket 2 with a double wall which has a semi-circular bottom (FIG. 3), and a cover 24 provided at the top of the jacket 2 which can be opened/closed. Said jacket 2 is supplied via a pipe 23 with hot water vapor i.e., steam as the heat source. As shown in FIGS. 1 and 2, an inlet port 4 for the rice is provided above the starting end 1a of the steam vessel 1. A predetermined amount each of washed rice and water is continuously supplied into the vessel 1 from said inlet port 4. As the screw conveyer 3 transports the rice toward the terminal end 1b, the rice is sequentially heated and boiled by the heat of the hot water vapor (i.e., steam) supplied into the jacket 2.

A pair of stirring vanes 7 parallel to a shaft 6 of said screw conveyer 3 is provided at the outer periphery of a spiral vane 5, whereby the rice grains and water are conveyed toward the terminal end 1b of the vessel 1 while being mixed. The steaming process (or boiling process) in conducted in the portion A1 which takes up about one third of the length of the vessel from the starting end 1a to release the starch from the rice. Gelatilation of the starch released from the rice is conducted in the portion A2 which takes up about one third of the length at the middle, and adsorption of the gelatinized starch by the rice takes place in the portion A3 in the final one third of the vessel length toward the terminal end 1b. Water charged into the steam vessel together with the rice at the inlet port 4 changes into the cooking juice containing the starch in the mid portion of the vessel 1 and a part of which is discharged out of the vessel into a duct 9 together with steamed rice grains which have not yet completely adsorbed the gelatinized starch.

The steamed rice discharged onto the duct 9 is further conveyed to the starting end 11a of a net or mesh conveyer 11 projecting from the steam tunnel passage 10 at the starting end 10a thereof. A laterally swinging comb 12 is provided at the bottom of the duct 9 so that the comb 12 reciprocating in lateral directions spreads uniformly onto the starting end 11a of the conveyer the steamed rice grains discharged from the outlet 8 of the vessel 1 into the duct 9.

The conveyer 11 inside the steam tunnel passage 10 is a very fine mesh of stainless steel and conveys the steamed rice from the duct 9 toward the terminal end 10b of the passage 10. Pipes 13 are connected to a vapor source (not shown) and supply hot water vapor above and below said conveyer 11 with respect to the conveyer surface of the cooked rice grains in the longitudinal direction. Each vapor supply pipe 13 is provided with spray nozzles 14 facing the conveyer 11 to spray the rice grains with hot water vapor and to maintain high temperature and humidity inside the tunnel passage 10.

A sump 15 for retaining the cooking juice discharged from the outlet 8 of the vessel together with the cooked rice gains is provided below said duct 9 and the conveyer's starting end 11a. The sump 15 is provided with a supply pipe 17 for supplying the cooking juice to a spray nozzle 18 provided above said conveyer's starting end 11a via a pump 16, and a supply pipe 19 for feeding the juice back into the vessel 1 at its mid portion.

The cooked rice grains transferred from the duct 9 onto the conveyer 11 in the passage 10 are separated from the cooking juice when dropped onto the conveyer's starting end 11a. Thus, the starch adhered on the surface of the rice grains alone is adsorbed in the rice grains in the subsequent steps. However, as the cooking juice from the sump 15 is sprayed on the surface of the rice grains, an extra supply of the gelatinized starch adheres on the rice grain surface. The cooked rice grains in this state are conveyed inside the tunnel passage 10, and a suitable amount of the gelatinized starch is adsorbed in the rice in the first half of the passage B1. In the latter half of the passage B2, a fixing process is conducted to coat the rice grain surface with gelatinized starch.

A portion of said cooking juice is returned from the sump 15 to the vessel 1 at its mid poriton via a supply pipe 19, thereby making up the lack of the cooking juice which had been discharged together with the cooked rice from the outlet 8 and ensuring adequate adsorption of gelatinized starch in the final section of the vessel.

A second laterally swinging comb 20 similar to the first one is provided at the terminal end 11b of the conveyer in the tunnel passage 10. The rice grains cooked on the conveyer are tossed and loosened by the comb 20 and transferred into a receptacle 22 on a further conveyer 21.

The steam vessel with a screw conveyer according to the present invention is positioned horizontally, and releasing of gelatinized starch from the rice by steaming i.e., boiling and initial adsorption of the gelatinized starch is conducted in the steam vessel. The remaining portions of the adsorption and fixing process of the gelatinized starch are conducted while the cooked rice is being carried on the conveyer in the steam tunnel passage. Since the cooked rice which comes out of the outlet port of the steam vessel consists of discrete grains that have not yet completely adsorbed the cooking juice, the cooked rice in grains can be continuously transported out of the steam vessel by the screw conveyer with ease.

The cooked rice discharged from the steam vessel is separated once from its cooking juice, and the cooking juice is pooled in the sump before being injected on the rice grains from the upper starting end of the conveyer in the steam tunnel passage to supplement the gelatinized starch. This enables adequate fixing of the gelatinized starch and enables continuous and efficient cooking of the rice.

What is claimed is:

1. An automatic and continuous rice cooking system, comprising:
   an elongated spiral rotary steam vessel which is arranged horizontally and houses a screw conveyer;
   a steam tunnel passage with a mesh conveyer which is horizontally arranged and connected to said steam vessel;
   said spiral rotary steam vessel comprising:
   a double walled steam jacket having a top and a semi-circular bottom;
   a cover at the top of said jacket and which is movable between an open position and a closed position;
   an inlet for charging rice provided above a starting end portion of said steam vessel; and
   an outlet for discharging the rice provided at a terminal end portion of said steam vessel;

said screw conveyer being housed inside said steam vessel along said semi-circular bottom substantially over the entire length of said steam vessel, said screw conveyer comprising:
a shaft;
a spiral vane extending along said shaft; and
a pair of mixing vanes provided on an outer peripheral portion of said spiral vane substantially in parallel with said shaft;
said steam tunnel passage being connected to said outlet of said steam vessel via a duct, and said steam tunnel passage housing at least a major portion of said mesh conveyer, said mesh conveyer having a starting end at the end thereof nearest to said steam vessel and a terminal end remote from said starting end, and said mesh conveyer comprising a conveying means made of a very fine stainless steel mesh for conveying rice;
said steam tunnel passage further comprising sump means arranged at least beneath said starting end of said mesh conveyer and extending beneath said duct, for receiving cooking juice separated from cooked rice;
steam supply means including a steam supply pipe with nozzles for injecting steam onto cooked rice both from top and bottom surfaces of said mesh conveying means, said steam supply means being arranged inside said steam tunnel passage along the length of said mesh conveyer;
nozzle means provided above said starting end of said mesh conveyer for spraying a cooking juice on cooked rice being conveyed by said mesh conveyer, the cooking juice being drained into said sump means, said drained cooking juice containing gelatinized starch; and
said sump means further comprising a supply pipe for returning and supplementing said drained cooking juice to said steam vessel at a mid portion of said steam vessel.

2. The automatic and continuous rice cooking system of claim 1, further comprising a laterally swinging comb means provided outside of said duct at said outlet of said steam vessel for distributing and spreading rice grains discharged from said duct onto said starting end of said mesh conveyer.

3. The automatic and continuous rice cooking system of claim 2, further comprising a laterally swinging comb means provided at said terminal end of said mesh conveyer in said steam tunnel passage for spreading and discharging into a receptacle on a further conveyer the rice that has been cooked by having passed through said tunnel passage.

4. The automatic and continuous rice cooking system of claim 1, further comprising a laterally swinging comb means provided at said terminal end of said mesh conveyer in said steam tunnel passage for spreading and discharging into a receptacle on a further conveyer the rice that has been cooked by having passed through said tunnel passage.

5. The automatic and continuous rice cooking system of claim 1, further comprising a conveyer with a receptacle provided at said terminal end of said mesh conveyer for receiving rice that has been cooked by having passed through said steam tunnel passage.

6. The automatic and continuous rice cooking system of claim 5, further comprising a laterally swinging comb means provided at said terminal end of said mesh conveyer in said steam tunnel passage for spreading and discharging into said receptacle on said conveyer the rice that has been cooked by having passed through said tunnel passage.

7. The automatic and continuous rice cooking system of claim 1, wherein said steam vessel is elongated, and includes:
first section where a steaming process for releasing starch from the rice is carried out while said rice charged into said inlet at said starting end is transported upward toward said terminal end of said steam vessel by said screw conveyer;
a second section where gelatination of the starch released from said steamed rice takes place; and
a third section where adsorption of said gelatinized starch by rice grains takes place.

8. The automatic and continuous rice cooking system of claim 1, wherein said steam tunnel passage is elongated, and includes:
a first section where gelatinized starch is adsorbed by the rice as said cooking juice containing the gelatinized starch is sprayed on said rice at said starting end of said conveyer while the cooked rice is being conveyed by said conveyer; and
a second section including means for spraying hot water vapor, and where a fixing process takes place in which the surfaces of the cooked rice is coated with said gelatinized starch under high temperature and high humidity as said hot water vapor is sprayed.

9. The automatic and continuous rice cooking system of claim 1, wherein said outlet of said steam vessel is on a side surface thereof, and said steam tunnel passage is connected substantially at a right angle to said outlet of said steam vessel at its terminal end.

10. The automatic and continuous rice cooking system of claim 1, wherein said outlet of said steam vessel is on a side surface thereof.

11. An automatic and continuous rice cooking system, comprising:
an elongated spiral rotary steam vessel which is arranged horizontally and houses a screw conveyer;
a steam tunnel passage with a mesh conveyer which is horizontally arranged and connected to said steam vessel;
said spiral rotary steam vessel comprising:
a steam jacket having a top and a semi-circular bottom having a hollow receiving area;
a cover at the top of said jacket and which is movable between an open position and a closed position;
an inlet for charging rice provided above a starting end portion of said steam vessel; and
an outlet for discharging the rice provided at a terminal end portion of said steam vessel;
said screw conveyer being housed inside said hollow receiving area of said steam vessel and extending along said receiving area substantially over the entire length of said steam vessel, said screw conveyer comprising:
a shaft;
a spiral vane extending along said shaft; and
a pair of mixing vanes provided on an outer peripheral portion of said spiral vane substantially in parallel with said shaft;
said steam tunnel passage being connected to said outlet of said steam vessel via a duct, and said steam tunnel passage housing at least a major portion of said mesh conveyer, said mesh conveyer having a starting end at the end thereof nearest to said steam vessel and a terminal end remote from said starting end, and said mesh conveyer comprising a mesh conveying means for conveying rice;

said steam tunnel passage further comprising sump means arranged at least beneath said starting end of said mesh conveyer and extending beneath said duct, for receiving cooking juice separated from cooked rice;

steam supply means including a steam supply pipe with nozzles for injecting steam onto cooked rice both from top and bottom surfaces of said mesh conveying means, said steam supply means being arranged inside said steam tunnel passage along the length of said mesh conveyer;

nozzle means provided above said starting end of said mesh conveyer for spraying a cooking juice on cooked rice being conveyed by said mesh conveyer, the cooking juice being drained into said sump means, said drained cooking juice containing gelatinized starch; and said sump means further comprising a supply pipe for returning and supplementing said drained cooking juice to said steam vessel at a mid portion of said steam vessel.

12. The automatic and continuous rice cooking system of claim 11, further comprising a laterally swinging comb means provided outside of said duct at said outlet of said steam vessel for distributing and spreading rice grains discharged from said duct onto said starting end of said mesh conveyer.

13. The automatic and continuous rice cooking system of claim 12, further comprising a laterally swinging comb means provided at said terminal end of said mesh conveyer in said steam tunnel passage for spreading and discharging into a receptacle on a further conveyer the rice that has been cooked by having passed through said tunnel passage.

14. The automatic and continuous rice cooking system of claim 11, further comprising a laterally swinging comb means provided at said terminal end of said mesh conveyer in said steam tunnel passage for spreading and discharging into a receptacle on a further conveyer the rice that has been cooked by having passed through said tunnel passage.

15. The automatic and continuous rice cooking system of claim 11, further comprising a conveyer with a receptacle provided at said terminal end of said mesh conveyer for receiving rice that has been cooked by having passed through said steam tunnel passage.

16. The automatic and continuous rice cooking system of claim 15, further comprising a laterally swinging comb means provided at said terminal end of said mesh conveyer in said steam tunnel passage for spreading and discharging into said receptacle on said conveyer the rice that has been cooked by having passed through said tunnel passage.

17. The automatic and continuous rice cooking system of claim 11, wherein said steam vessel is elongated, and includes:

first section where a steaming process for releasing starch from the rice is carried out while said rice charged into said inlet at said starting end is transported upward toward said terminal end of said steam vessel by said screw conveyer;

a second section where gelatination of the starch released from said steamed rice takes place; and a third section where adsorption of said gelatinized starch by rice grains takes place.

18. The automatic and continuous rice cooking system of claim 11, wherein said steam tunnel passage is elongated, and includes:

a first section where gelatinized starch is adsorbed by the rice as said cooking juice containing the gelatinized starch is sprayed on said rice at said starting end of said conveyer while the cooked rice is being conveyed by said conveyer; and a second section including means for spraying hot water vapor, and where a fixing process takes place in which the surfaces of the cooked rice is coated with said gelatinized starch under high temperature and high humidity as said hot water vapor is sprayed.

19. The automatic and continuous rice cooking system of claim 11, wherein said outlet of said steam vessel is on a side surface thereof, and said steam tunnel passage is connected substantially at a right angle to said outlet of said steam vessel at its terminal end.

20. The automatic and continuous rice cooking system of claim 11, wherein said outlet of said steam vessel is on a side surface thereof.

21. The automatic and continuous rice cooking system of claim 11, wherein said steam jacket is double walled.

* * * * *